Dec. 24, 1935.  I. D. RICHHEIMER.  2,025,333
COFFEE MAKING APPARATUS
Filed July 12, 1934   2 Sheets-Sheet 1
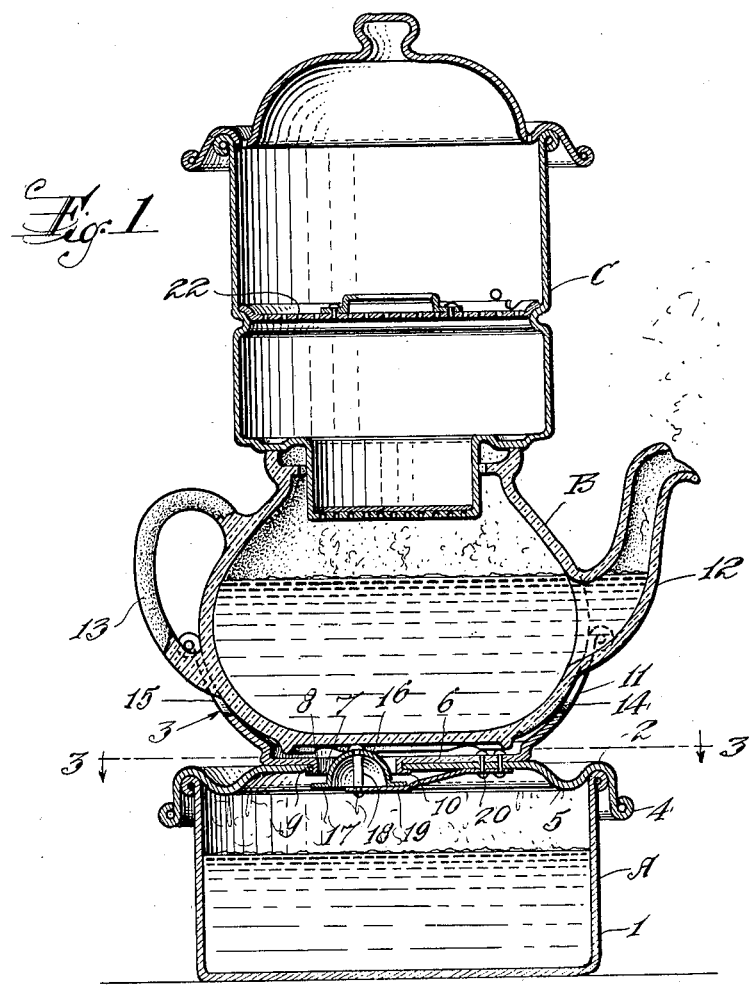
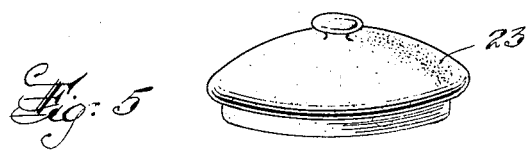

Dec. 24, 1935.  I. D. RICHHEIMER  2,025,333
COFFEE MAKING APPARATUS
Filed July 12, 1934  2 Sheets-Sheet 2
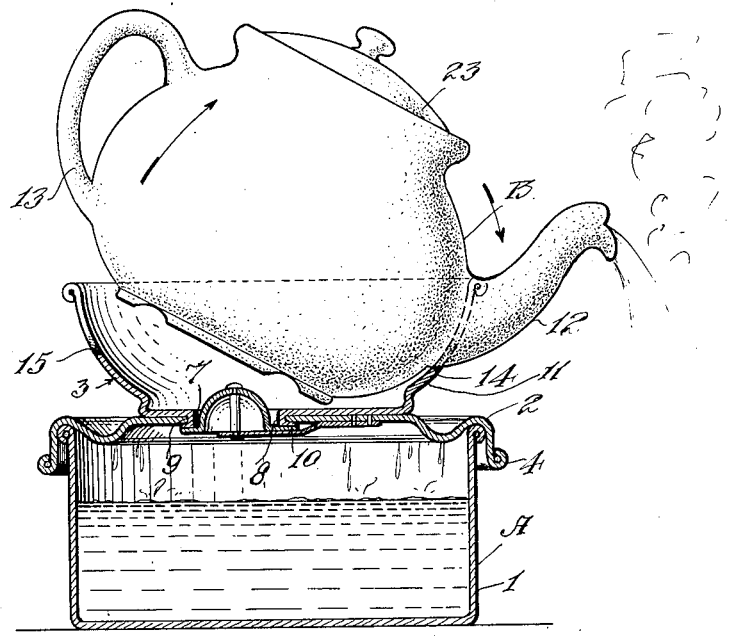
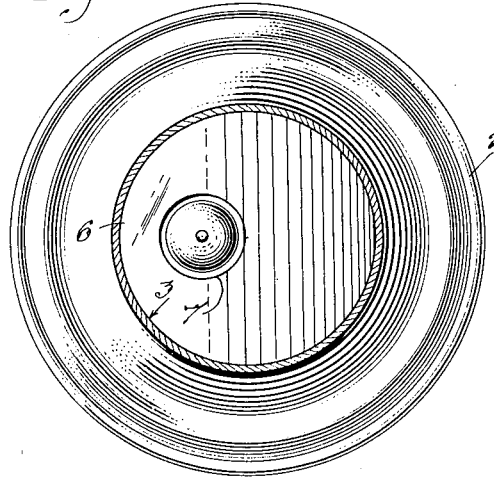
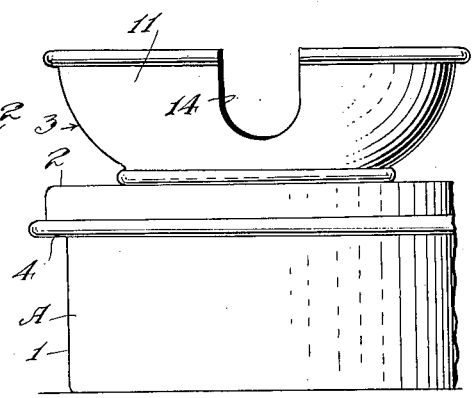
INVENTOR
Isaac D. Richheimer,
BY
Harry R. Rook,
ATTORNEY Patented Dec. 24, 1935

2,025,333

UNITED STATES PATENT OFFICE 2,025,333

COFFEE MAKING APPARATUS

Isaac D. Richheimer, New York, N. Y.

Application July 12, 1934, Serial No. 734,791

7 Claims. (Cl. 126—246)

This invention relates to coffee making apparatus and particularly of the drip type, although the invention may be utilized in the making of coffee by other methods than the drip method. As is known to those skilled in the art it is highly desirable that the receptacle that receives the water after it has been passed through the ground coffee should be warm when the water enters the receptacle from the coffee retaining receptacle in order to prevent rapid cooling of the liquid coffee which may result in separation of the oils from the coffee and affect the taste of the coffee. Moreover, difficulty has been encountered in maintaining the liquid coffee in uniformly hot condition after the coffee has been made.

One object of my invention is to provide a novel and improved coffee urn for heating the receptacle which contains the liquid coffee and for maintaining the liquid coffee in hot condition for the purpose of serving, said urn to comprise a steam chamber containing water to be vaporized into steam, in combination with a seat on the said chamber to receive the coffee pot or receptacle which contains the liquid coffee, and a valve for controlling the flow of steam from the steam chamber into contact with the bottom of the pot in said seat.

Another object is to provide a coffee urn of this general character wherein escape of steam between the pot and said seat shall be automatically prevented by seating of the pot in the seat, and the valve for controlling the flow of steam from the steam chamber in contact with the bottom of the pot shall be automatically opened by placing of the pot in the seat and shall be automatically closed upon removal of the pot from the seat, so that the steam shall be in constant contact with the pot while the latter is in the seat, but escape of steam from the steam chamber shall be prevented when the pot is partially or wholly removed from the seat to prevent scalding or burning of the hand of the operator manipulating the pot.

Further objects are to provide a novel and improved construction and combination of a steam chamber, seat for the coffee pot and valve for controlling communication between the steam chamber and the seat, and to provide a novel and improved valve which shall be simple and inexpensive and reliable and durable in operation, and to provide a novel and improved combination of a cover for the steam chamber, a seat for the coffee pot, and a valve opening, whereby the structure shall be simple and inexpensive, reliable and durable and attractive in appearance.

Other objects are to provide a novel and improved combination of such a coffee urn with a drip receptacle, whereby the steam chamber shall preheat the coffee pot to receive the hot water from the drip receptacle; and to obtain other advantages and results as will be brought out by the following description.

Referring to the accompanying drawings in which corresponding and like parts are designated throughout the several views by the same reference characters.

Figure 1 is a vertical longitudinal sectional view through coffee making apparatus embodying my invention, showing the parts in the position assumed during making of the coffee, Figure 2 is a similar view of the coffee urn showing the manner of pouring the coffee from the pot.

Figure 3 is a horizontal sectional view on the line 3—3 of Figure 1.

Figure 4 is a side elevation of the steam chamber and seat for the coffee pot with the coffee pot removed and viewing the apparatus from a position at right angles to that shown in Figure 2, and Figure 5 is a perspective view of the coffee for the coffee pot.

Specifically describing the illustrated embodiment of the invention the coffee making apparatus includes a steam chamber A, a coffee pot B which is preferably formed of china or earthenware and a drip receptacle C.

The steam chamber is shown as comprising a pan 1 to contain water to be vaporized into steam. This pan may be heated in any suitable manner as by placing it over a gas flame or an electric heater. The pan has a removable cover 2 which is combined with a concave seat 3 for the coffee pot B. This cover is shown as formed of one piece of sheet metal having a flange 4 to overhang the rim of the pan and a depending rib 5 disposed within the pan. The concave seat 3 is shown as formed of a single piece of sheet material and has a bottom 6 set on the top of the cover 2 and formed with an opening 7 having a flange 8 passing through a corresponding opening 9 in the cover and clinched at 10 over the underside of the cover for securing the seat to the cover. The side walls 11 of the seat are shaped to approximately correspond to the shape of the lower portion of the walls of the pot B so that the walls of the pot may snugly contact with the walls 11 of the seat to provide a substantially liquid tight joint therebetween. Preferably the walls 11 are so shaped as to hold the bottom of the pot in spaced relation to the bottom of the seat. The pot has the usual pouring spout 12 and handle 13 and the edges of the seat 3 are notched at 14 and 15 to provide clearance for the spout and handle respectively.

Secured to the underside of the cover 2 is a valve for controlling the passage of steam through the opening 7. This valve is shown as comprising a dome shaped head 16 of sheet metal having a perimetral flange 17 to abut the edge 10 of the flange 9 so as to close the opening 7. This valve head 16 is mounted by a pin 18 on the end of a spring strip 19 the other end of which is riveted at 20 to the cover so that the spring normally holds the valve seated to close the opening 7. When the valve is closed the dome head projects upwardly beyond the bottom of the seat so that when the coffee pot is set into the seat, the bottom of the pot engages the valve head and forces it downwardly to unseat it and permit communication between the steam chamber and the seat as shown in Figure 1. When the coffee pot is removed from the seat, the valve spring 19 will automatically seat the valve as shown in Figure 2.

In making the coffee the drip receptacle C may be set into the mouth of the pot B as shown in Figure 1 and coffee may be placed between the bottom of the drip receptacle and the usual perforate coffee retainer 22. Water is poured into the drip receptacle so that it may trickle through the ground coffee and into the coffee pot. Preferably the pot is mounted on the steam chamber and steam is generated in the latter prior to the pouring of the water into the drip receptacle so that the coffee pot will be preheated. After the coffee has been made, the drip receptacle is removed and the cover 23 is placed on the pot. The pot may be then kept hot by the steam from the steam chamber 1 which will circulate in the space between the bottom of the pot and the bottom of the seat 3. When pouring the coffee, the pot may be entirely removed from the seat, but conveniently the pot may be simply tilted with a swivel action in the concave seat as shown in Figure 2 so that the operator need not assume the full weight of the pot, and wobbling of the pot during pouring will be obviated. There will be no danger of steam flowing up around the sides of the pot when the latter is removed from the seat because the valve will automatically close the opening 7, and heating of the pot will continue automatically upon reseating of the pot so that no attention of the operator is necessary to control the heating of the pot. There is no danger of the pot becoming overheated because of the steam which will remain at a substantially constant temperature while the pan is heated, and of course the pot is wholly protected from contact with the flame so that danger of cracking the pot is wholly obviated.

The depending rib 5 on the cover 2 will cause the water of condensation to drip from the rib into the pan and prevent such water from following the underside of the pan over the flange 4 as might be the case if this rib 5 were not provided. Water of condensation will automatically flow backwardly from the seat into the chamber and the dome shape of the valve will facilitate such draining of the water. Therefore, all exposed parts of the apparatus will be maintained in dry condition and there will be no uncomfortable or unsightly moisture collected about the exposed surfaces.

While I have shown and described my invention as embodied in certain details of construction it should be understood that this is primarily for illustrating the principles of the invention and that many modifications and changes may be made without departing from the spirit or scope of the invention. Also, while I have described the invention as a coffee urn, the invention may be utilized for making and heating other beverages or liquids in receptacles.

Having thus described my invention, what I claim is:

1. A receptacle heating apparatus comprising a receptacle, a steam chamber having an exterior seat to removably receive said receptacle and a passage for permitting flow of steam from said chamber into said seat to contact with the walls of said receptacle, and a valve automatically closing said passage when the receptacle is raised from said seat and automatically opened as the receptacle is set in said seat.

2. A receptacle heating apparatus comprising a receptacle, a steam chamber having an exterior seat to removably receive said receptacle and a passage for permitting flow of steam from said chamber into said seat to contact with the walls of said receptacle, a valve controlling said passage and a spring for automatically actuating the valve to close the passage when said receptacle is raised from said seat, said valve having a portion to project through said opening when in closed position to be engaged by the receptacle as the latter is set into said seat for automatically actuating the valve into open position.

3. A heater and holder for pouring receptacles, comprising a pouring receptacle having curved walls, a steam chamber having an exterior seat to removably receive said receptacle and fit said curved walls of the latter so that the latter may have a swivel tilting movement in said seat, a passage for permitting flow of steam from said chamber into said seat to contact with the walls of said receptacle, and a valve automatically closing said passage when the receptacle is tilted in said seat and automatically opened as the receptacle is normally set in said seat.

4. The receptacle heating apparatus set forth in claim 1 wherein the walls of said receptacle have a substantially liquid tight contact with the walls of said seat to prevent escape of steam between the seat and the receptacle when the latter is set in the seat.

5. A receptacle heating apparatus comprising a steam chamber including a pan, a removable cover to overlie the rim of the pan and formed with a depending annular rib on the underside of the cover within the pan adjacent the rim thereof to prevent water of condensation from flowing along the underside of the cover over the rim of the pan, an exterior seat on said cover to removably receive said receptacle, a passage for permitting flow of steam from said chamber into said seat to contact with the walls of said receptacle, and a valve automatically closing said passage when the receptacle is raised from said seat and automatically opened as the receptacle is set in said seat.

6. A receptacle heating apparatus comprising a receptacle, a steam chamber having an exterior seat to removably receive said receptacle and a passage for permitting flow of steam from said chamber into said seat to contact with the walls of said receptacle, and a valve automatically closing said passage when the receptacle is raised from said seat and automatically opened as the receptacle is set in said seat, said valve including a dome head and a perimetral flange, said flange to seat against the underside of said cover around said opening to close the opening, and said dome head to project through said opening into said seat when the opening is closed to be engaged and unseated by the receptacle as the latter is seated.

7. A receptacle heating apparatus comprising a receptacle, a steam chamber having an exterior seat to removably receive said receptacle and a passage for permitting flow of steam from said chamber into said seat to contact with the walls of said receptacle and a valve automatically closing said passage when the receptacle is raised from said seat and automatically opened as the receptacle is set in said seat, said valve including a dome head and a perimetral flange, said flange to seat against the underside of said cover around said opening to close the opening, and said dome head to project through said opening into said seat when the opening is closed to be engaged and unseated by the receptacle as the latter is seated, and a spring strip for closing the valve upon one end of which said dome head is mounted and the other end of which is fastened to said cover.

ISAAC D. RICHHEIMER.